United States Patent Office.

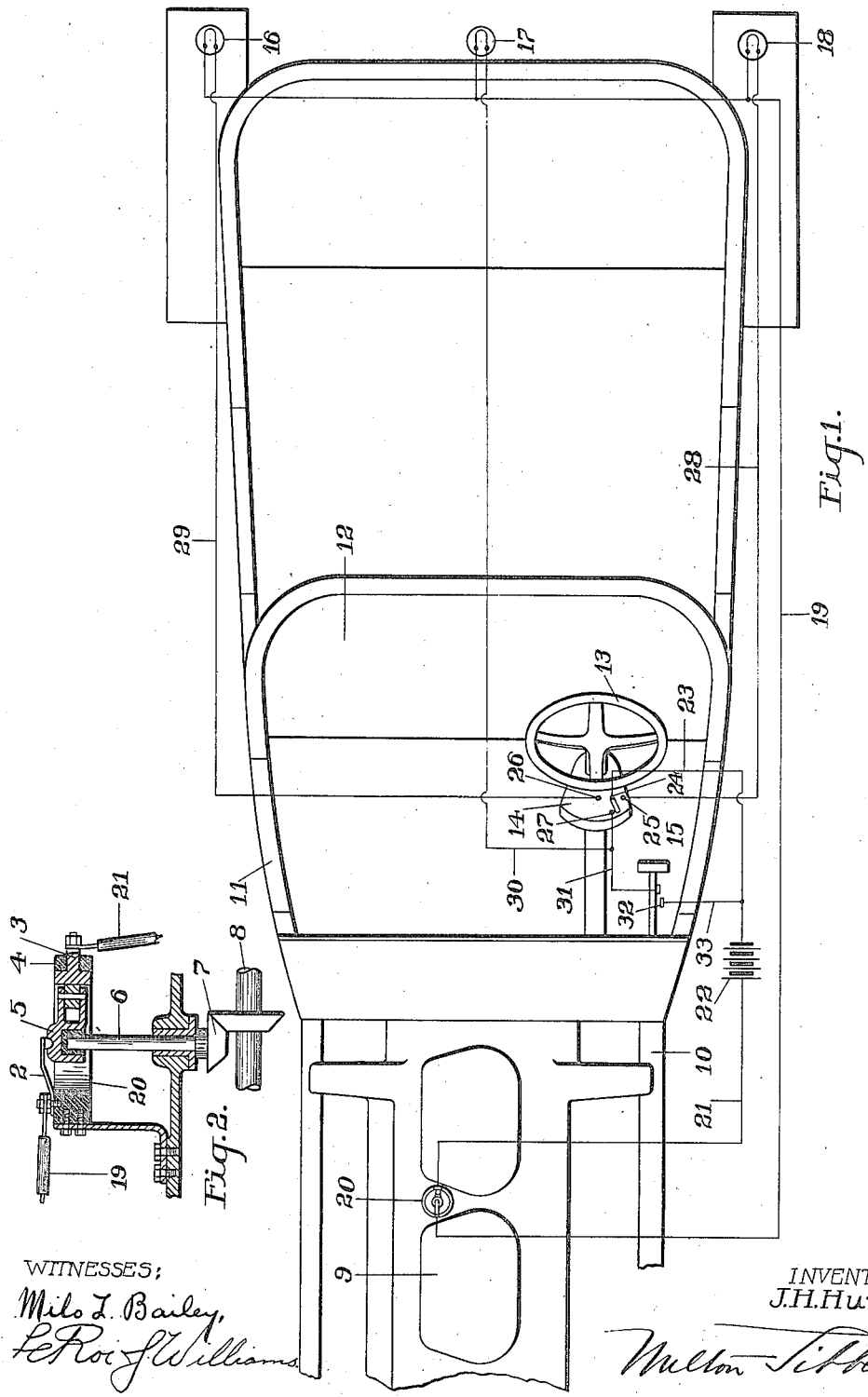

JOHN H. HUNT, OF DETROIT, MICHIGAN, ASSIGNOR TO PACKARD MOTOR CAR COMPANY, OF DETROIT, MICHIGAN, A CORPORATION OF MICHIGAN.

SIGNAL DEVICE FOR MOTOR-VEHICLES.

1,231,361. Specification of Letters Patent. Patented June 26, 1917.

Application filed March 24, 1913. Serial No. 756,517.

*To all whom it may concern:*

Be it known that I, JOHN H. HUNT, a citizen of the United States, and resident of Detroit, Wayne county, State of Michigan, have invented certain new and useful Improvements in Signal Devices for Motor-Vehicles, of which the following is a specification.

This invention relates to a signal device for motor vehicles, and particularly to signal devices therefor.

One of the objects of the invention is to provide a motor vehicle with a signal light arranged preferably at the rear of the vehicle, the circuit of which light shall be under the control of the operator of the vehicle and which shall also be intermittently broken and made by some mechanical or other means, whereby the light will be caused to flash or light up and go out intermittently.

Another object of the invention is to provide a motor vehicle with a plurality of such lights as those described in the preceding paragraph and provide the circuits of such lights with a selector switch within easy reach of the operator, the circuit to be controlled by another switch, preferably operated by the vehicle motor and acting to intermittently open and close the circuits.

Another object of the invention is to provide a motor vehicle with a signal light which may be controlled by a manually operated switch and by another switch which is preferably connected with the vehicle brake pedal and which circuit is also intermittently made and broken for the purpose of flashing the signal light to thereby more certainly attract the operator of a vehicle following.

These and other objects will be clear from the following description, taken in connection with the drawings which form a part of this specification, and in which.
Figure 1 represents a plan view of a motor vehicle with lights, circuits and switches, showing one embodiment of the invention; and Fig. 2 is a detail sectional view of a form of interrupter used.

Referring particularly to the drawings, 10 represents the motor vehicle frame upon which is mounted the motor 9 and the body 11; 12 is the operator's seat in front of which is the steering wheel 13 and the control or switch board 14, which, as will be seen, is convenient to the operator. Convenient to the operator also is the brake pedal 15, which is adapted to actuate the brakes of the vehicle.

Preferably at the rear of the vehicle are mounted signaling devices 16, 17 and 18, which are shown in the form of lights or incandescent bulbs, which may be lighted to signal to the operator of a following vehicle. It will be understood, however, that these signaling devices may be in any other suitable form, such as semaphores, which may be electrically or mechanically operated. In the present embodiment of the invention, these signaling devices 16, 17 and 18 are shown as electrically operated and one of the conductors leading from them and numbered 19, passes through a make and break switch or interrupter 20, and then through a conductor 21 to a battery 22. From the other side of the battery 22 a conductor 23 leads to a switch 24, which may be termed a selector switch, and which is mounted upon the control or switch board 14, hereinabove referred to. The switch 24 has three points 25, 26 and 27. The point 25 leads through a conductor 28 to the signaling device 18, and preferably indicates that the operator is about to turn the vehicle to the left. The point 26 is connected by a conductor 29 with the signaling device 16, which preferably indicates that the operator is about to turn the vehicle to the right. The point 27 is connected through a conductor 30 with the signaling device 17 and preferably is arranged to indicate that the operator is about to slow the vehicle down, or stop. The point 27 is also connected through a conductor 31 with a contact device or switch 32, mounted upon or operated by the pedal lever 15, hereinabove described, and the contact device 32 is connected with one pole of the battery through a conductor 33 and the conductor 23 hereinabove described.

It will be understood that the interrupter or make and break device 20 may be operated by some moving part of the vehicle motor, as shown in the drawing, or it may be operated by the battery 22. In Fig. 2, one form of mechanical make-and-break device or interrupter is shown as operated by the motor cam shaft 8, through bevel gears 7. The constantly revolving shaft 6 causes the insulated arm 5 to rotate in the ring 4 of insulating material, thereby making intermittent contact with the terminal 3 of the conductor 21. The conductor 19 is connected with the arm 5 through the stationary arm 2 which bears on the center of the arm 5.

The purpose of this device is, as above pointed out, to constantly make and break the electric circuit of the signal device and make the latter flash as long as the operator holds the switch 24 on one of the points 25, 26 or 27. It will also be understood that the selector switch 24 is entirely under the control of the operator, while the contact device 32 is automatic in its action, in that this contact is made and the stop signal flashed whenever the brake is applied by the operator.

While I have herein described in some detail a specific embodiment of my invention, which I deem to be new and advantageous, I do not desire it to be understood that my invention is limited to the exact details of construction shown, as it will be apparent that changes may be made therein without departing from the spirit or scope of my invention.

Having thus described my invention, what I claim and desire to secure by Letters Patent is:

1. In a motor vehicle, the combination with a series of signal lights and a battery and circuits therefor, of a manually operated selector switch for said circuits, and a switch operated by the vehicle acting to intermittently open and close the selected circuits.

2. In a motor vehicle, the combination with a signal light and a battery and circuit therefor, of a manually operated switch for said circuit, and a switch in said circuit operated by the vehicle motor independently of the movement of the vehicle and acting to intermittently open and close the circuit.

In testimony whereof I affix my signature in the presence of two witnesses.

JOHN H. HUNT.

Witnesses:
JOHN D. WILSON,
LE ROI J. WILLIAMS.